United States Patent
Quernemoen

(10) Patent No.: US 6,687,719 B1
(45) Date of Patent: *Feb. 3, 2004

(54) ALGORITHMS TO CALCULATE MASS STORAGE REQUIREMENTS FOR NT SIZER

(75) Inventor: John M. Quernemoen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/516,272

(22) Filed: Feb. 29, 2000

(51) Int. Cl.$^7$ .............................................. G06F 12/00
(52) U.S. Cl. .................................................... 707/205
(58) Field of Search ........................... 707/2, 100, 101, 707/104.1, 205; 711/118, 129, 170, 171

(56) References Cited

U.S. PATENT DOCUMENTS

| | | | |
|---|---|---|---|
| 5,065,360 A | 11/1991 | Kelly | 708/142 |
| 5,617,514 A | 4/1997 | Dolby et al. | 706/45 |
| 5,630,025 A | 5/1997 | Dolby et al. | 706/46 |
| 6,061,763 A * | 5/2000 | Rubin et al. | 711/129 |
| 6,542,893 B1 * | 4/2003 | Quernemoen | 707/100 |

OTHER PUBLICATIONS

Compaq Computer Corporation, "White Paper", 5 pages, Jun. 1998.
Kim Shanely, "History and Overview of the TPC", 14 pages, Feb. 1998.
"TPC–C Results—Revision 3X", downloaded from www.tpc.org, 4 pages, dated prior to Feb. 29, 2000.
"TPC–R Benchmark", downloaded from www.tpc.org, 2 pages, dated prior to Feb. 29, 2000.
"TPC–H Benchmark", downloaded from www.tpc.org, 2 pages, dated prior to Feb. 29, 2000.
Jack Stephens, "TPC–D The Industry Standard Decision Support Benchmark", 28 pages, dated prior to Feb. 29, 2000.
Select pages from www.tpc.org, 12 pages, downloaded Nov. 2, 1999.
User Guide, Compaq System Sizer v8.1 for Oracle 8i NT4.0, Compaq Computer Corporation, Jun. 1999, pp. 1–40.
User Guide, Compaq Sizer 2.30 for Microsoft SQL Server 7.0, Compaq Computer Corporation, Oct. 1999, pp. 1–44.
"TPC–D Benchmark", downloaded from www.tpc.org, 6 pages, dated prior to Feb. 29, 2000.

* cited by examiner

*Primary Examiner*—Diane D. Mizrahi
*Assistant Examiner*—Apu M Mofiz
(74) *Attorney, Agent, or Firm*—Charles A. Johnson; Mark T. Starr; Crompton, Seager & Tufte, LLC

(57) ABSTRACT

Methods for calculating mass storage requirements for a relational database table including both data pages and index pages. The methods allow direct calculation of the data storage and index storage requirements for a data base table, the methods based in part on the page size, the record length, and the number of records. The database requirement can be increased by partial unavailability of pages and rows. The methods include methods for calculating the number of B-tree levels in the index or indexes. The methods avoid the need for interactive calculations of the required size for a database table starting from the number of records, record size, and page size.

23 Claims, 6 Drawing Sheets

ALGORITHMS TO CALCULATE MASS STORAGE REQUIREMENTS FOR NT SIZER

CROSS-REFERENCE TO RELATED APPLICATIONS

The present application is related to U.S. patent application Ser. No. 09/514,506, filed Feb. 29, 2000, entitled METHODS OF COMPARISON FOR COMPUTER SYSTEMS AND APPARATUS THEREFOR; U.S. patent application Ser. No. 09/515,308, filed Feb. 29, 2000, entitled DATABAASE SIZER FOR NT SIZER SYSTEM; U.S. patent application Ser. No. 09/515,310, filed Feb. 29, 2000, entitled SIZING SERVERS FOR DATABASE MANAGEMENT SYSTEMS VIA USER DEFINED WORKLOADS; U.S. patent application Ser. No. 09/514,801, filed Feb. 29, 2000, entitled COMBINATION OF MASS STORAGE SIZER, COMPARATOR, OLTP USER DEFINED WORKLOAD SIZER, AND DESIGN TRADE-OFF TOOL IN ONE PACKAGE; U.S. patent application Ser. No. 09/515,158, filed Feb. 29, 2000, entitled BUILT IN HEADROOM FOR AN NT SYSTEM SIZER, all of which are assigned to the assignee of the present invention and incorporated herein by reference.

FIELD OF THE INVENTION

The present invention is related generally to computers and database software. More specifically, the present invention is related to software for sizing databases in a relational database management systems (RDBMSs). The present invention includes methods and systems for determining the required size for database storage including both data and B-tree indexes.

BACKGROUND OF THE INVENTION

Relational databases came into common use in computers over twenty years ago. Despite improvements in database software and new methodologies, relational databases remain the mainstay of database management systems. Hardware vendors originally supported proprietary database management systems which ran primarily on machines manufactured by the hardware vendor. Software developers later developed database management systems that were more open and ran on computers made by several vendors. The database management systems were also ported to run under various operating systems. This gave the advantage of spreading the cost of development over more sites and also uncoupled the dependence between hardware vendors and software vendors. Third party support and training also became more common.

Database management systems also became separated into client side software and server side software. This meant that the server side software was decoupled from software having to do with the display, use, and formatting of the data received from the database. In particular, server side software often handled mostly queries of existing data along with updates of existing data and insertion of new data.

Modem electronic commerce such as commerce over the Internet or business-to-business electronic commerce has placed increased demands on many servers. This has also made frequent upgrades necessary. Company mergers and acquisitions frequently make it necessary to incorporate large amounts of data from unexpected sources. Customer expectations also make it necessary to upgrade hardware to keep up with the faster response times users expect even though system loads may be increasing as well.

When upgrading or replacing database servers it is necessary to have a good idea as to the size of the database that will be implemented on the new server. The data storage as well as storage of many different indexes will all increase the amount of data required. It may be necessary to come up with a good estimate of the required amount of mass storage in a short time period, as during bid evaluations, during sales presentations, or repeatedly during scenario building. The person supplying the input may have only a rough idea as to the size of the database mass storage requirements.

What would be desirable, therefore, are methods for calculating the data storage requirements for a relational database table and its indexes without requiring interatively calculating the number of index levels, the number of data pages, and the number of index pages.

SUMMARY OF THE INVENTION

The present invention includes methods for calculating the mass storage requirements for a relational data base table based on the number of rows, columns, column widths, page size, and the fractional utilization allowed for each page. The total data storage requirement can be calculated by multiplying the number of pages required by the bytes per page. The bytes per page is given by the database vendor and the number of pages required for data can be calculated by dividing the number of data records per table by the number of data records per data page. The number of data records per table can be given by the user and the number of data records possible per data page can be calculated by dividing the amount of data space available per data page by the record size in the table. The term record size refers to the mass storage space reserved for the record rather than the exact size required for each populated record. The amount of data space available per data page can be provided by the data base vendor and is often the maximum size of the page reduced by various factors. The record size can be calculated based on the column widths, number of columns, and for some RDBMS, variability in column widths.

The number of mass storage bytes required for storing the indexes is a function of the number of index pages and the available space per index page for storing index data. The type of calculations vary depending on whether the B-trees have physical order indexes or non-physical order indexes. The height of a B-tree is the number of index pages that are accessed before reading the first data page; an alternative definition includes accessing the first data page in calculating the height.

In the case of physical order indexes, the tree height is a function of the number of data pages, and the average number of index records per page of index records. The number of data pages can be determined as previously discussed. The average number of index records per page of index records can be calculated as a function of the space available per index page to store index records, and the index record size. The index record size refers to the mass storage space required for an index record. The space available per index page for index records can be calculated as a function of the index record page size reduced by factors such as fill factors and number of index records reserved.

In the case of non-physical order indexes, the tree height is a function of the number of leaf pages, and the average number of index records per non-leaf page of index records. Each record in a leaf page contains the index value of the data record and either a pointer to the record in mass storage or a physical order index value depending on the RDBMS. There are a many leaf records as there are data records. The average number of index records per non-leaf page of index records can be calculated as a function of the available space in a non-leaf index page to hold index records and the index record size. The number of leaf pages can be calculated as a function of the number of data records in the table and the average number of index records per leaf page of index records, as previously discussed Thus, the present invention provides methods for calculating the mass storage requirements for RDBMS tables including both the data requirements and the B-tree index requirements without requiring iterations, counting, or a traversal of the tree to be sized.

DETAILED DESCRIPTION OF THE INVENTION

Figure 1:
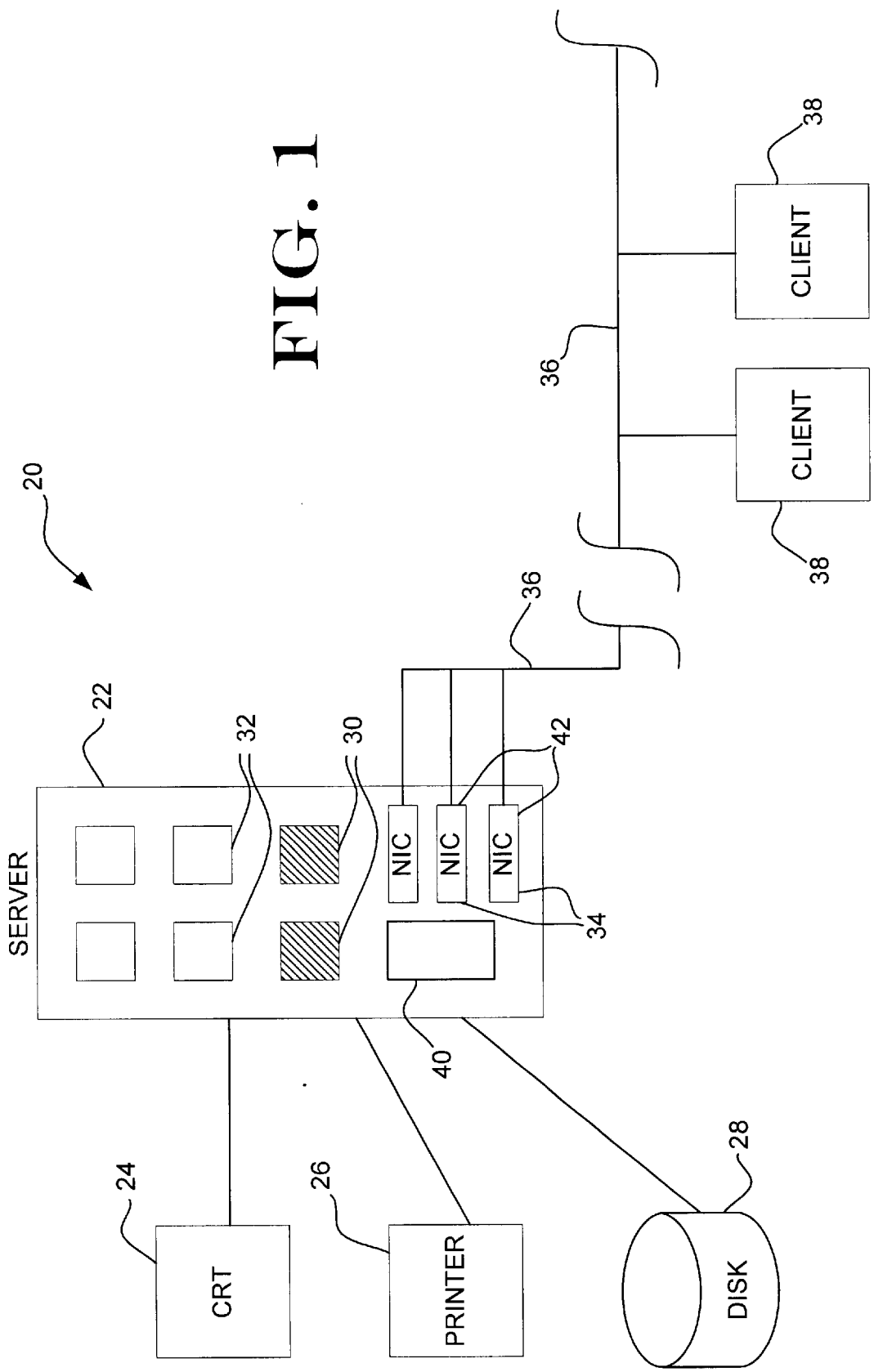
FIG. 1 is a highly diagrammatic schematic of a computer system including a database server.

FIG. 1 illustrates generally a database server system 20 including a server 22 supported by a CRT 24 and a printer 26 for programming, display, maintenance, and general Input/Output uses. Within server 22 is illustrated several CPU sockets 30 and 32, with CPU sockets 30 being populated with CPUs and CPU sockets 32 remaining empty for future expansion and population. Server 22 also includes a memory portion 40 which can contain a sufficient quantity of Random Access Memory (RAM) to meet the server's needs. A disk 28 is illustrated for mass storage, which can include disk drives or any other technology capable of holding the contents of the databases or databases to be managed. Several Network Interface Cards (NICs) 42 are illustrated as part of server 22 and are coupled to a network illustrated by a network link 36 which can be any communication link including Local Area Networks, Wide Area Networks, Ethernet, and the Internet.

Also connected to data link 36 are client computers 38. Software clients can, in fact, reside on the same machine as the server, but in common practice, the client processes usually run on a different machine. In one embodiment, server 22 is a computer running on the Microsoft NT operating system and clients 38 are smaller computers running a Microsoft Windows operating system.

Server 22 is preferably scaleable, having extra socketed capacity for memory, processors, NICs, and disk drives. This allows extra CPUs, memory, NICs, and mass storage such as disk drives to be initially set to meet current needs and later expanded to meet changing needs.

Figure 2:
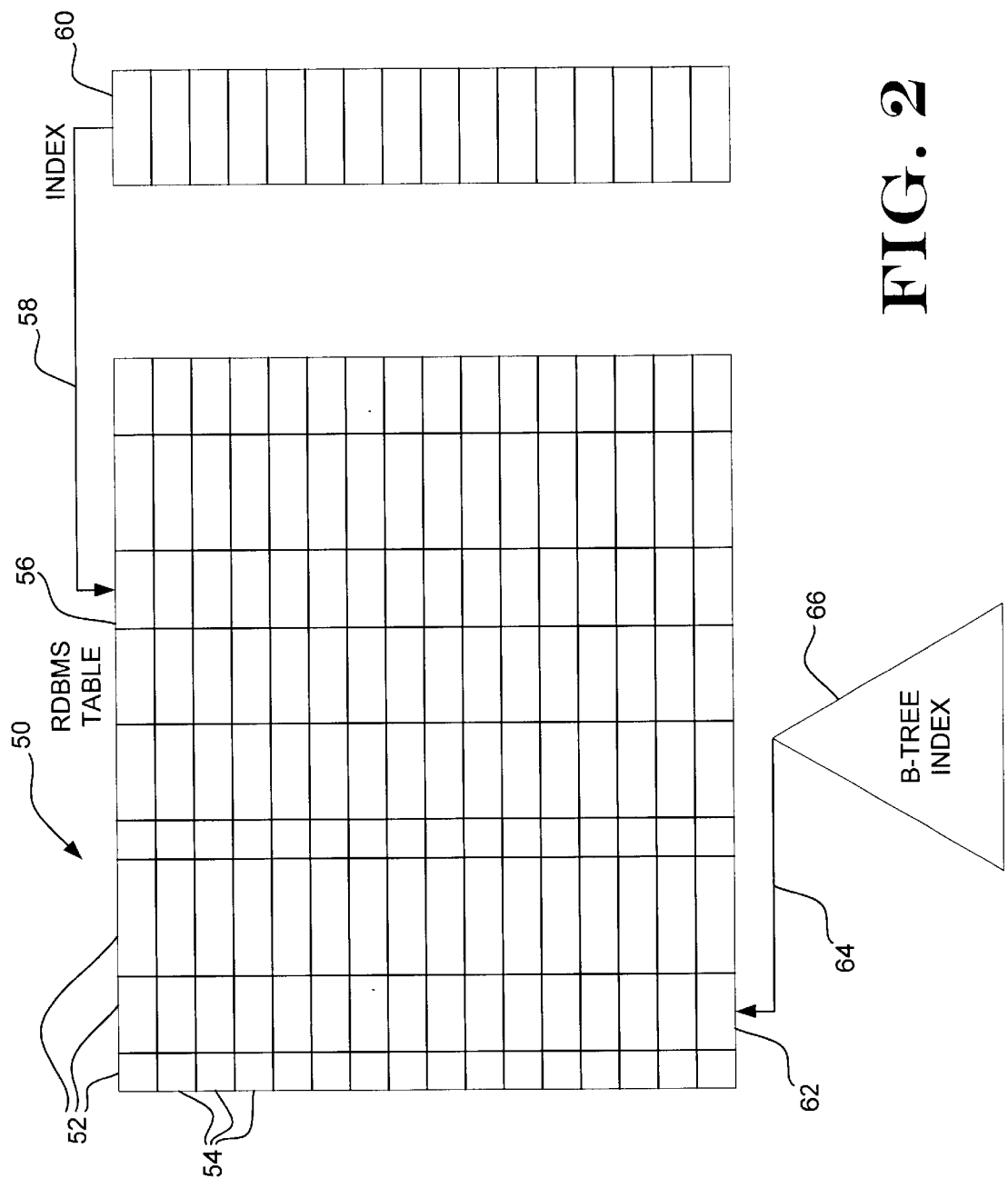
FIG. 2 is a highly diagrammatic view of a relational database.

Servers such as server 22 often exist to contain and manage data bases, such as those contained within relational database management systems (RDBMS). RDBMS include tables formed of rows or records and columns. FIG. 2 illustrates an RDBMS table 50 formed of several columns 52 and several rows or records 54. Columns 52 typically include both fixed length or width columns and variable length or width columns, where the variable length may be allocated out of a common buffer elsewhere outside of the table itself. In practice, an RDBMS system has numerous tables to be stored and managed.

It is possible for rows 54 to be ordered according to one of the columns. In practice however, the records are typically not ordered, but are linked to indices that are ordered. In a simple example, one of columns 52, such as column 56, may contain a person's social security number and be linked via a software link 58 to an ordered index 60 which contains a sorted list of social security numbers along with the record number at which the corresponding record resides. Such a sorted list of only one column of table 50 can shorten a search from order n to order log n. Such a sorted list still requires sorting upon the addition, deletion, and change of data.

A commonly used index method is illustrated for column 62, which is linked via a software link 64 to a B-tree index 66. B-tree 66 can contain a multi-level tree well known to those skilled in the software arts. B-tree 66 can be a multi-way tree such as an AVL tree or a 2–3 tree. B-tree indices have the advantage of being quick and easy to modify, without requiring massive amounts of sorting such as in a linear sorted index such as index 60. In particular, a B-tree can be maintained in a balanced condition with the addition of data to avoid skewing the shape of the tree. Maintaining the balance of the tree allows a log n search time to be maintained as well.

In practice, an RDBMS may use only a B-tree for the indexing scheme, due to its utility and flexibility. An RDBMS may maintain a B-tree on any column for which ordered searching may be later requested. As the number of columns to be indexed approaches the number of columns in the table, the data storage requirements for the indices themselves approach and pass the data storage requirements of the table itself. Thus, the data storage requirements of the indices are an important factor to be considered when determining the mass storage requirements for a table and RDBMS.

Figure 3:
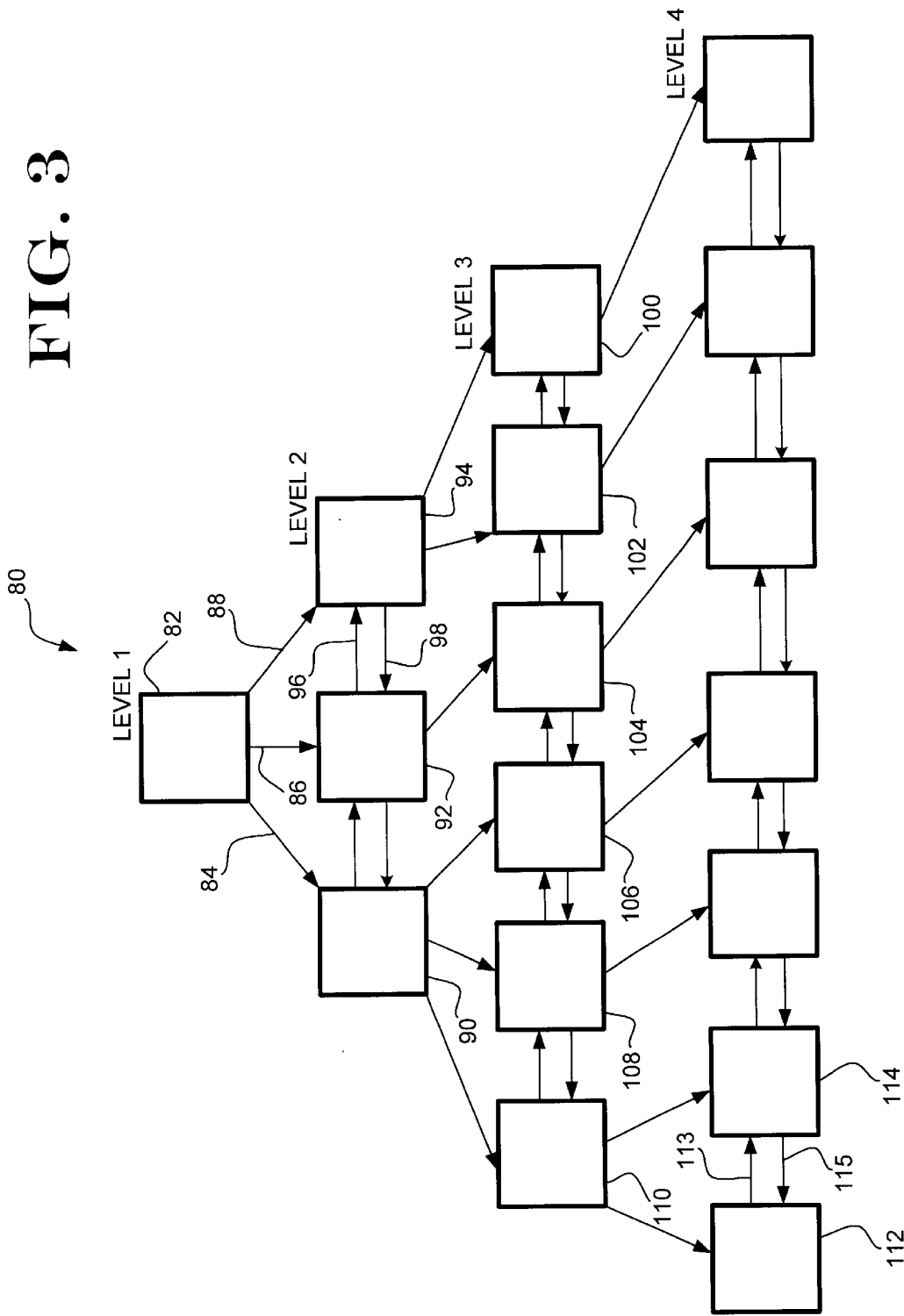
FIG. 3 is a highly diagrammatic view of a B-tree index for a relational database.

FIG. 3 illustrates a B-Tree 80 including a root node 82 at level 1 having three links 84, 86, and 88 to nodes 90, 92, and 94 respectively at level 2. The nodes at level 2 are illustrated as being doubly linked themselves through links such as links 96 and 98. Links between nodes at the same level, such as links 96 and 98, make maintenance of the B-tree somewhat easier, and browsing can be made somewhat easier as well through use of such links. At level 3, links 100, 102, 104, 106, 108, and 110 are pointed to by the links at level 2. Level 4 is the last level in the tree. B-tree 80 has four levels, or a tree height of four. Level 4 may be said to be the "failure level" of the tree, as level 4 is the level at which a search of the tree will fail if it is to fail. If a value such as a social security number is searched for but there is no such record in the database, level 4 is the level at which the search will fail. At level 4, nodes 112 and 114 are linked together as a doubly linked list by links 113 and 115. In practice, the failure level of a B-Tree is often linked together in this or a similar manner.

In a B-tree, the nodes in the B-tree typically contain only the key or column values the tree is ordered for and points to nodes in the next level related to those keys or column values. For example, in a two-way tree, a node would have one index value, and two pointers, indicating which nodes to go to for values greater than or less than the index value, respectively. B-Trees and databases vary in what they have at the failure level. In some databases, herein termed "physical ordered databases", the failure level has the records themselves linked together. In these databases, once the failure level is reached, the record has been obtained, with no further I/O necessary to obtain the record. In other databases, herein termed "non-physical ordered databases", the nodes at the failure level contain only pointers or record numbers into the main table. In these databases, another I/O is required to obtain the record of interest. In some databases, the failure level contains neither the record of interest nor a pointer to the record of interest. Instead, a unique key is contained, requiring a search on that key to obtain the record of interest. For example, a search of B-Tree ordered on last name plus first name may return only a social security number upon successful completion. Another B-tree or highly optimized index based on social security number can then be rapidly searched for the record of interest. In this scheme, at least one more I/O is required after the failure level has been reached. The number I/Os required to reach a record is of interest to because it determines in part the speed of the database. Both disk I/O and network I/O require latent time to process.

In sizing a database, the RDBMS typically has a page size, or an aggregate unit of mass storage typically numbering thousands of bytes. The page size on some computers may be determined in part by operating system and disk system factors. The page size may also be determined by a desire to keep the width of internal variables within the database to manageable limits. The page size is fixed in some RDBMSs and selectable in other RDBMSs.

The amount of mass storage required for a single table is a function of several variables, such as the number of rows or records and the number of columns. The database storage required is not a simple calculation of the row size and column sizes for several reasons. First, the column sizes or widths may be variable. Second, the page size enters into the calculation in a non-continuous manner, as some database allocation such as record allocation must lie within a single page rather than cross page boundaries, with some space wasted as a result. Third, some space in a page is set aside for future expansion or reserved for use a buffer space, as when re-ordering data. Fourth, not all space within a page is available for end user data storage, with some being used by the RDBMS itself or for other overhead. In particular, in some RDBMSs, a fraction of each page is specified as not available for initial storage. In some RDBMSs, a number of rows are set aside as non-usable. In some RDBMSs, a fraction of each record is set aside as non-usable. As previously mentioned, the size of the indices may be a large portion of table storage even though the data itself may not be stored within the indices. All of the aforementioned factors makes sizing the required databases a complicated matter, as is dealt with below.

Figure 4:
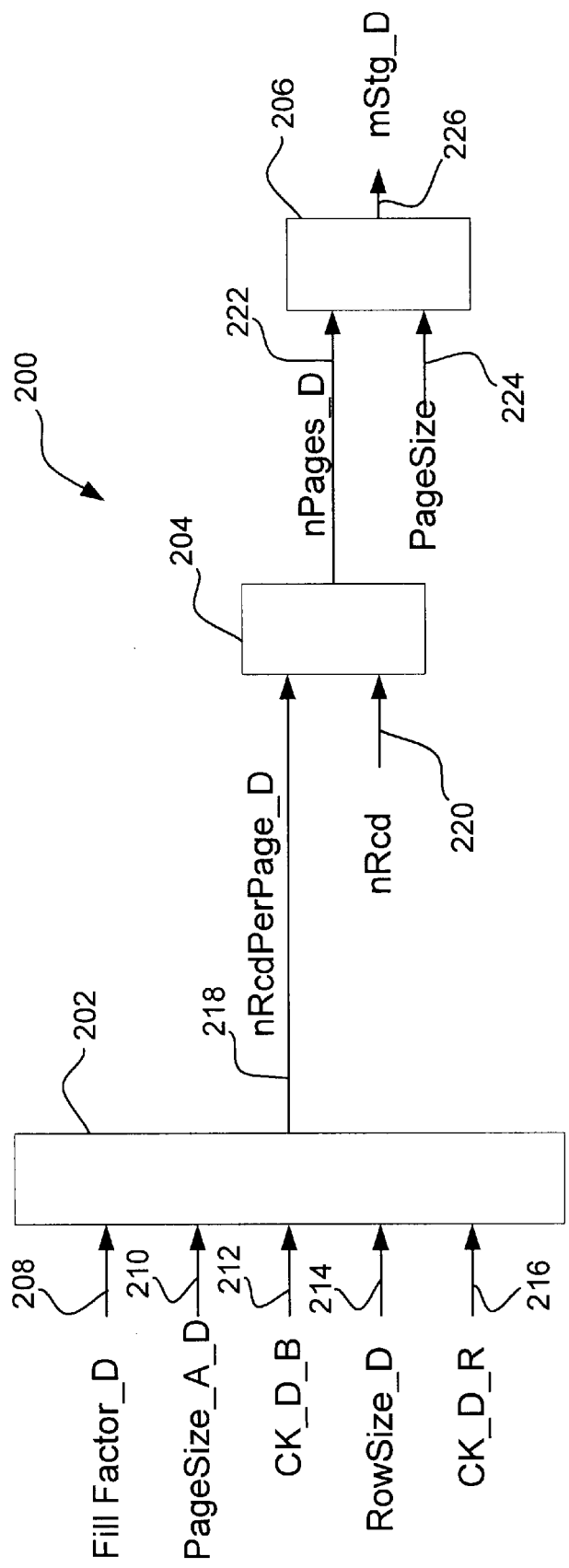
FIG. 4 is a simplified data flow diagram of an illustrative method for determining the amount of mass storage required for data in a table.

Referring now to FIG. 4, a simplified data flow diagram illustrates the data inputs and outputs for an algorithm. Algorithm 200 is illustrated having a number of inputs, and provides the mass storage requirement, represented by mStg_D 226, for a single table. An algorithm, method, or equation 202 includes as inputs: PageSize_A_D 210 which represents the amount of space available in a data page to hold data records; FillFactor_D 208 which represents the proportion of PageSize_A_D 210 that is available for data rows on initial load; CK_D_B 212 which represents a constant non-negative integer used to adjust the available space in a page; RowSize_D 214 which represents the size of a row or record in a table after adding formatting; and CK_D_R 216 which represents a constant non-negative integer used to assure room for CK_D_R more records after initial load. The result of algorithm 202 is nRcdPerPage_D 218, which represents the number of data records per page of data records. In one embodiment, algorithm 202 provides:

$$\text{nRcdPerPage\_D} = \text{int}((\text{FillFactor\_D} * \text{PageSize\_A\_D} - \text{CK\_D\_B}) / \text{RowSize\_D}) - \text{CK\_D\_R} \quad (1)$$

Another method 204 includes nRcdPerPage_D 218 as an input along with nRcd 220 which represents the number of records in the table and calculates nPages_D 222 as a output, which represents the number of data record pages. In one embodiment, method 204 is:

$$\text{nPages\_D} = \text{CEILING}[\text{nRcd}/\text{nRcdPerPage\_D}]. \quad (2)$$

Another method 206 includes nPages_D 222 as an input, along with PageSize 224 which represents the size of a database page or block and calculates mStg_D 226. In one embodiment, method 206 is:

$$\text{MStg\_D} = \text{nPages\_D} * \text{PageSize}. \quad (3)$$

Figure 5:
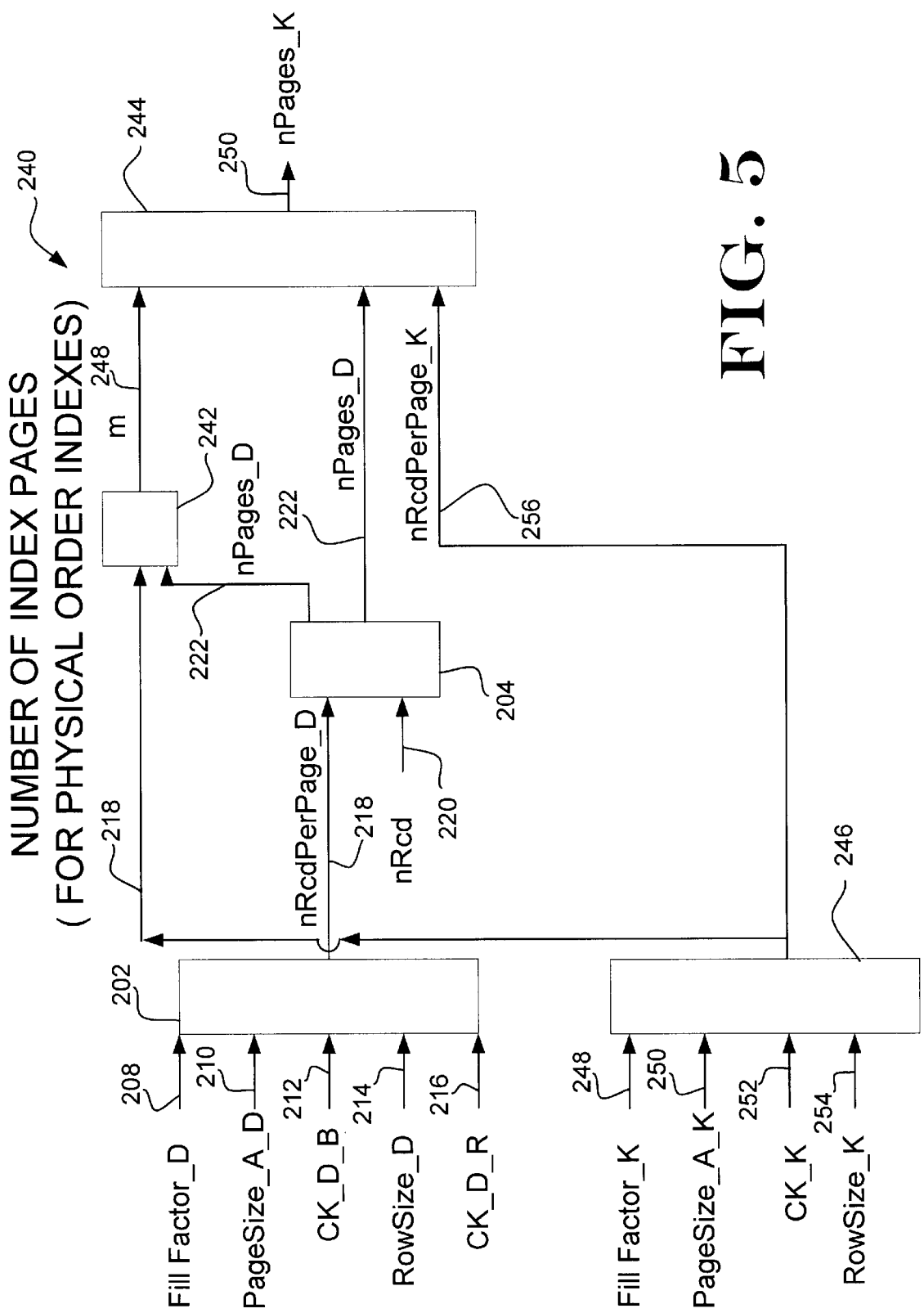
FIG. 5 is a simplified data flow diagram of an illustrative method for determining the number of B-tree levels and index pages required for a table having physical order indexes.

Referring now to FIG. 5, a simplified data flow diagram illustrates the data inputs and outputs for an algorithm 240. Algorithm 240 calculates the number of index pages for physical order indexes. Method 246 outputs nRcdPerPage_K 256, which represents the average number of index records per page of index records. Method 246 includes as inputs: FillFactor_K 248 which represents the proportion of PageSize_A_K that is available for index rows on initial load; PageSize_AK 250 which represents the amount of space available in an index page to hold index records for physical order indexes; CK_K 252 which represents a constant non-negative integer used to insure there is at least CK more records when inserting; and RowSize_K which represents the size of an index row after adding formatting for physical order indexes. In one embodiment, method 246 utilizes the equation:

$$\text{nRcdPerPage\_K} = \text{int}(\text{FillFactor\_K} * \text{PageSize\_A\_K} / \text{RowSize\_K}) - \text{cK\_K}. \quad (4)$$

Method 242 accepts nRcdPerPage_K 256 as a input as well as nPages_D 222, and outputs m 248, where m is related to tree height, as discussed elsewhere. In one embodiment, method 242 utilizes the equation below to determine a value for m:

$$m = \text{CEILING}[\log(\text{nPages\_D})/\log(\text{nRcdPerPage\_K}) + 1]. \quad (5)$$

Method 244 includes as inputs m 248, nPages_D 222, and nRcdPerPage_K 256, all previously discussed. Method 244 outputs nPages_K 250, which represents the total number of index pages. In one embodiment, method 244 utilizes the equation:

$$\text{nPages\_K} = 1 + \text{nPages\_D} * ((1 - (1/\text{nRcdPerpage\_K})^{(m-2)})/(\text{nRcdPerPage\_K} - 1)). \quad (6)$$

Figure 6:
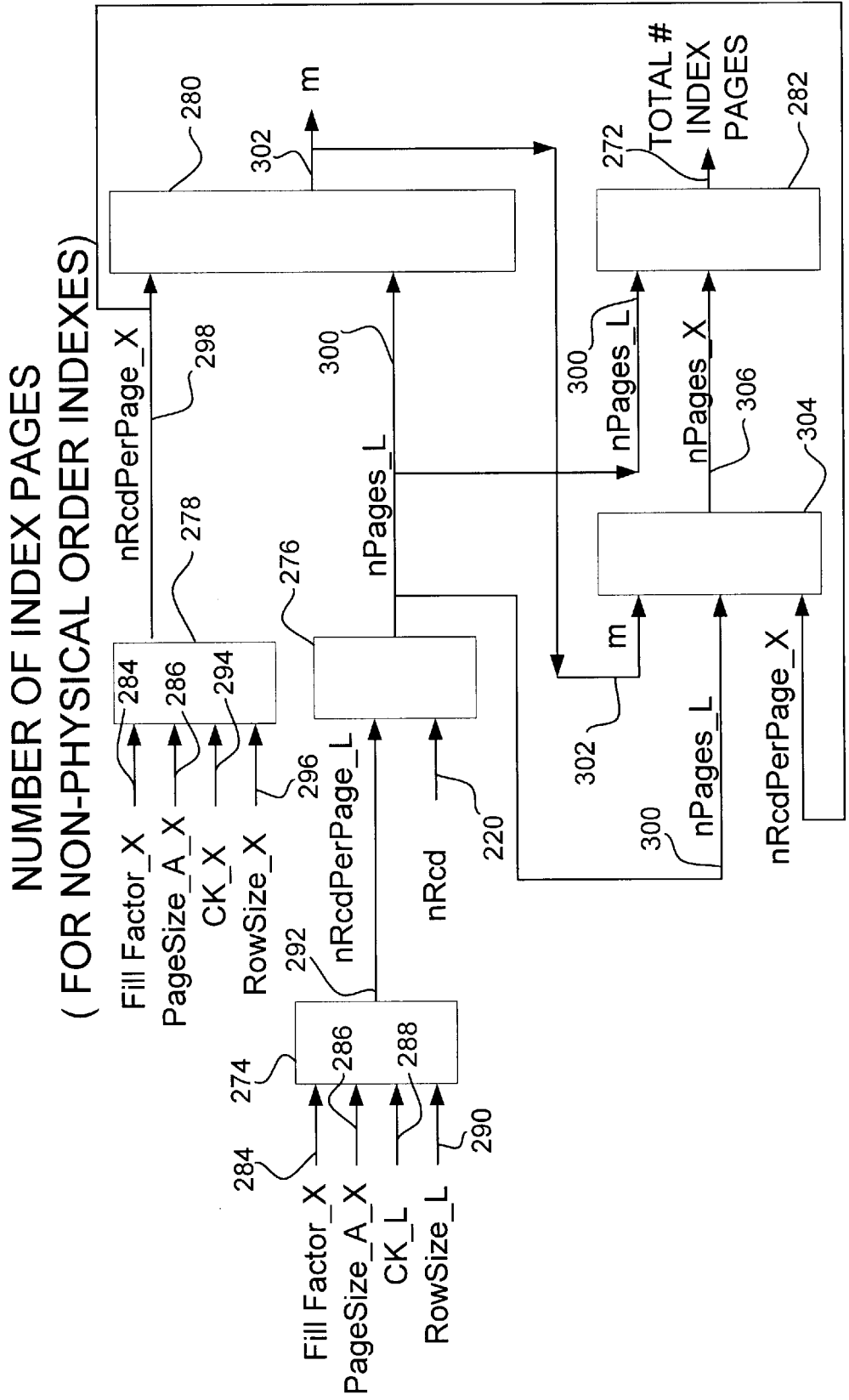
FIG. 6 is a simplified data flow diagram of an illustrative method for determining the number of index pages required for a table having non-physical order indexes.

Referring now to FIG. 6, a method 270 for calculating the total number of index pages for non-physical order indexes, represented by TOTAL # INDEX PAGES 272, is illustrated. A method 274 is included which outputs nRcdPerPage_L 292 which represents the average number of index records per leaf page of index records for non-physical order indexes. Method 274 includes as inputs: FillFactor_X 284 which represents the proportion of PageSize_A_X 286 that is available for index rows in a non-leaf page on initial load for non-physical order indexes; PageSize_A_X 286 which represents the amount of space available in a non-lead index page to hold index records in non-physical order indexes; CK_L 288 which represents a constant non-negative integer used to insure there is room for at least CK_L more index records when inserting or modifying data records; and RowSize_L 290 which represents the size of a leaf page row after adding formatting for non-physical order indexes. In one embodiment, method 274 utilizes the equation:

$$nRcdPerPage\_L = int(FillFactor\_X * PageSize\_A\_X/RowSize\_X) - cK\_L. \quad (7)$$

Method 278 outputs nRcdPerPage_X 298 which represents the average number of index records per non-leaf page of index records for non-physical order indexes. Inputs FillFactor_X 284 and PageSize_A_X 286 are as previously described. Input CK_X 294 represents a constant, non-negative integer used to insure there is room for at least CK_X more index records when inserting or modifying data records, and input RowSize_X 296 represents the size of a leaf page row after adding formatting for non-physical order indexes. In one embodiment, method 278 utilizes the equation:

$$nRcdPerPage\_X = int(FillFactor\_X * PageSizeA\_X/RowSize\_L) - cK\_X. \quad (8)$$

Method 276 outputs nPagesL 300 which represents the number of leaf pages and utilizes inputs nRcdPerPage_L 292 and nRcd 220, previously described. In one embodiment, method 276 utilizes the equation:

$$nPages\_L = CEILING(nRcd/nRcdPerPage\_L). \quad (9)$$

Method 280 outputs m 302 which represents the parameter m described elsewhere which is related to B-Tree height. Method 280 utilizes as inputs nRcdPerPage_X 298 and nPages_L 300, both previously described. In one embodiment, method 280 utilizes the equation:

$$m = CEILING[\log(nPages\_L)/\log(nRcdPerPage\_X)] + 2. \quad (10)$$

Method 304 includes as inputs nPages_L 300, m 302, and nRcdPerPage_K 256, all previously described. In one embodiment, method 304 utilizes the equation:

$$npages\_X = 1 + nPages\_L * ((1-(1/nRcdPerPage\_X)^{(m-2)})/(nRcdPerPage\_X-1). \quad (11)$$

Finally, method 282 sums together nPages_L 300 and nPages_X 306 to obtain the total number of index pages 272.

EXAMPLE OF USE

As an illustration of one implementation of the present invention, a detailed description of some database management systems and the attendant calculations are described below. In the discussions that follow, the calculations pertain to a single table, unless otherwise noted.

| | | Definitions |
|---|---|---|
| RowSize_D | = | Size of row or record in a table after adding formatting |
| RowSize_K | = | Size of an index row after adding formatting; Physical-Order-Indexes |
| RowSize_L | = | Size of a Leaf page row after adding formatting; Non- Physical-Order-Indexes |
| RowSize_X | = | Size of a non-leaf page, index row after adding formatting; Non-Physical-Order-Indexes |
| nRcd | = | No. of records in table |
| PageSize | = | Size of a database page; also called a block, e.g., db_block_size in Oracle |
| PageSize_A_D | = | Amount of space available in a data page to hold data records; this may be subject to further adjustment either before or after taking into consideration the fill factor |
| PageSize_A_K | = | Amount of space available in an index page to hold index records; Physical-Order-Indexes |
| PageSize_A_L | = | Amount of space available in a leaf page to hold index records; Non- Physical-Order-Indexes |
| PageSize_A_X | = | Amount of space available in a non-leaf, index page to hold index records; Non- Physical-Order-Indexes |
| FillFactor_D | = | Proportion of PageSize_A_D that is available for data rows on initial load; also called PCTFREE in Oracle where PCTFREE = 100 − FillFactor. In Oracle PCTFREE is applied globally to the entire database; in SQL Server, FillFactor can be changed with each table and index. |
| FillFactor_K | = | Proportion of PageSize_A_K that is available for index rows on initial load; Physical-Order-Indexes |
| FillFactor_X | = | Proportion of PageSize_A_X that is available for index rows in a non-leaf page on initial load; Non- Physical-Order-Indexes |

The terms Physical-Order-Indexes and Non-Physical-Order-Indexes, are defined below. The values RowSize_D, RowSize_K, RowSize_L, PageSize_A are calculated as a function of the overhead involved with the specific RDBMS. The values nRcd, PageSize, FillFactor are input parameters.

Data Record Calculations

For data records, the desired metrics are the number of pages required to hold each table, and the resulting mass storage requirement, i.e., no. of pages times the page size. We have the following calculations:

| | | |
|---|---|---|
| nRcdPerPage_D | = | No. of data records per page of data records |
| | = | Int ( (FillFactor_D * PageSize_A_D − CK_D_B ) / RowSize_D ) − CK_D_R |
| nPages_D | = | No. of data record pages |
| | = | ⌈ nRcd / nRcdPerPage_D ⌉ |
| MStg_D | = | Mass storage requirement for the table only |
| | = | NPages_D * PageSize |
| where | | |
| ⌈x⌉ | = | Smallest integer greater than or equal to x, i.e. the CEILING function |
| CK_D_R | = | A constant, non-negative integer, used by some RDBMS' to assure room for CK_D_R more records after initial load; units are records |
| CK_D_B | = | A constant, non-negative integer, used by some RDBMSs to adjust the available space in a page; units are bytes |

Index Record Calculations

For B-Trees the metrics of interest are the number of B-Tree levels, the total number of pages in the B-Tree, and the resulting storage space required. In the discussion below, the number of B-Tree levels is defined as the minimum number of logical I/Os required to access a data page via an index; thus, in this case, both the root index page and the data page are counted in the number of B-Tree levels. We note that this may be contrary to other definitions; however, the intent here is to determine the number of logical I/Os.

Each record in an index page uniquely points to another page at the next level of the B-Tree. The contents of each record in an index page consist of an index value and the pointer.

| | | Definitions |
|---|---|---|
| nRcdPerPage_K | = | Average no of index records per page of index records; Physical-Order-Indexes |
| | = | Int ( FillFactor_K * PageSize_A_K / RowSize_K ) − cK_K |
| nRcdPerPage_L | = | Average no. of index records per leaf page of index records; Non-Physical-Order-Indexes |
| | = | Int ( FillFactor_X * PageSize_A_X / RowSize_X ) − cK_L |
| nRcdPerPage_X | = | Average no. of index records per non-leaf page of index records; Non-Physical-Order-Indexes |
| | = | Int ( FillFactor_X * PageSize_A_X / RowSize_X ) − cK_X | where cK_K, cK_L, and cK_X are each a constant, non-negative integer. Under certain conditions, and with certain RDBMS, this is an insurance that there is room for at least cK more records when inserting.

At the root level, say Level 1, of the B-Tree, there is $L_1=1$ page, containing at least two index records. At the next level, say Level 2, there are $L_2$ pages, each containing on the average nRcdPerPage_K or nRcdPerPage_X records. And so on. At level (m−1) the $L_{(m-1)}$ index records point to what are called leaf pages.

There are as many records in the set of leaf pages as there are data records. If the physical order of the data records is the same as the index defined, then the leaf pages are the data pages. Otherwise, a level of leaf pages is required to point to the data; as a result the number of leaf records and the number of data records are the same.

When the physical order of the data records is the same as the index defined, the type of index has been called "Clustered" by Microsoft SQL Server. Unisys 2200 RDMS has a similar construct called primary key; however, primary implies uniqueness of records as well. Oracle indexes appear to always have a leaf page level that is different from the data page level.

In the discussions that follow these two index types are referred to as Physical-Order-Index and Non-Physical-Order-Index. We also define the number of B-Tree levels as the number of logical I/Os required to access a data page via an index. Then, the number of B-Tree levels is m for Physical-Order-Indexes, and (m+1), for Non-Physical-Order-Indexes. Note here that "m" is just a notation and that the difference in the number of index levels between Physical-Order-Index and Non-Physical-Order-Index is not necessarily 1.

Physical-Order-Indexes

First the number of B-Tree levels are determined and then the number of pages.

Number of B-Tree Levels

The number of B-Tree Levels and the number of index pages can be determined using the following algorithm. Using the above notations, the number of index record pages at each level i, $L_i$, is calculated as follows wherein level m contains the leaf pages which are also the data pages.

| | | |
|---|---|---|
| $L_{m-1}$ | = | ⌈ nPages_D / nRcdPerPage_K ⌉ |
| $L_{m-2}$ | = | ⌈ $L_{m-1}$/nRcdPerPage_K ⌉ |
| | = | ⌈ nPages_D * ( 1 / nRcdPerPage_K ) ^ 2 ⌉ |
| | ... | |
| $L_1$ | = | ⌈ $L_2$/nRcdPerPage_K ⌉ |
| | = | ⌈ nPages_D * ( 1 / nRcdPerPage_K ) ^ (m − 1) ⌉ |
| | = | 1, since there is only one page at the root |
| Thus, | | |
| m | = | ⌈ log ( nPages_D ) / log ( nRcdPerPage_K ) + 1 ⌉ |

Number of Index Pages

The total number of index pages, nPages_K, is $$nPages\_K = \sum_{l=1}^{m-1} L_l$$
$$= 1 + nPages\_D^*((1 - (1/nRcdPerPage\_K)^{\wedge}(m-2))/(nRcdPerPage\_K-1))$$

Non-Physical-Order-Indexes

The calculations for non-physical-order indexes are similar. A record in a leaf page consists of an index value and a pointer to the corresponding data record.

| | | Definitions |
|---|---|---|
| nRcdPerPage_L | = | No. of index leaf records per leaf page |
| | = | Int (FillFactor_X * PageSize_A_X / RowSize_L) − cK_L |
| nPages_L | = | No. of leaf pages |
| | = | CEILING( nRcd / nRcdPerPage_L ) |

The number of index pages at each B-Tree level is the same as above, except that nPages_D is replaced by nPages_L. Thus, the number of B-Tree levels, m+1, is

```
m + 1    =  ( CEILING(log ( nPages_L ) /
             log ( nRcdPerPage_X ) ) + 1 ) + 1
         =  CEILING(log ( nPages_L ) /
             log ( nRcdPerPage_X ) ) + 2
```
and the number of pages for this index, including the leaf pages, is
```
nPages_L  += 1 + nRcd / nRcdPerPage_L +
npages_X     nPages_L * ( ( 1 − ( 1 / nRcdPerPage_X ) ^ (m−2) ) /
             ( nRcdPerPage_X − 1 )
```

RDBMS Specific Calculations

In the calculations that follow, define

| | | |
|---|---|---|
| FixedBytes_D | = | Sum of bytes in all fixed length columns in the table |
| VarBytes_D | = | Sum of bytes in all variable length columns in the table |
| FixedCol_D | = | No. of fixed length columns in the table |
| VarCol_D | = | No. of variable length columns in the table |
| FixedBytes_K | = | Sum of bytes in all fixed length columns in the Physical-Order-Index |
| VarBytes_K | = | Sum of bytes in all variable length columns in the Physical-Order-Index |
| FixedCol_K | = | No. of fixed length columns in the Physical-Order-Index |
| VarCol_K | = | No. of variable length columns in the Physical-Order-Index |
| FixedBytes_X | = | Sum of bytes in all fixed length columns in the Non-Physical-Order-Index |
| VarBytes_X | = | Sum of bytes in all variable length columns in the Non-Physical-Order-Index |
| FixedCol_X | = | No. of fixed length columns in the Non-Physical-Order-Index |
| VarCol_X | = | No. of variable length columns in the Non-Physical-Order-Index |

SQL Server 6.5

Constants are:
| | | |
|---|---|---|
| PageSize | = | 2048 |
| PageSize_A_D | = | 2016 (32 bytes of overhead) |
| PageSize_A_K | = | 2016 |
| PageSize_A_L | = | 2016 |
| PageSize_A_X | = | 2016 |
| cK_D_R | = | 0 if FillFactor = 100 |
| | = | 2 otherwise |
| cK_K | = | 0 if FillFactor = 100 |
| | = | 2 otherwise |
| cK_X | = | 0 if FillFactor = 100 |
| | = | 2 otherwise |
| CK_D_B | = | 0 |
| MaxRowSize | = | 2016; this is also the maximum column size |
| MaxColPerRow | = | 250 |

Calculations are as follows
```
RowSize_D  =  [ ( 2 + FixedBytes_D + VarBytes_D ) +
              (
              ( ( 2 + FixedBytes_D + VarBytes_D ) /
              256 + 1) + ( VarCol_D + 3 )
              ) * ( VarCol_D > 0 ) ]
RowSize_K  =  [ ( 5 + FixedBytes_K + VarBytes_K ) +
              (
              ( ( 5 + FixedBytes_K + VarBytes_K ) /
              256 + 1) + ( VarCol_K + 3 )
              ) * ( VarCol__K > 0 ) ]
RowSize_L  =  [ S + ( ( S + 3 ) / 256 + 4 ) *
              ( VarCol_X > 0 ) ]
RowSize_X  =  RowSize_L + 4
where
(X > Y)    =  1 if true
           =  0 if false
and
S          =  ( 7 + FixedBytes_X +
              VarBytes_X + VarCol_X )
```

SQL Server 7.0

Constants are:
| | | |
|---|---|---|
| PageSize | = | 8192 |
| PageSize_A_D | = | 8060 (96 bytes of overhead + row offset table) |
| PageSize_A_K | = | 8060 |
| PageSize_A_L | = | 8060 |
| PageSize_A_X | = | 8060 |
| cK_D | = | 0 if FillFactor = 100 |
| | = | 2 otherwise |
| cK_K | = | 0 if FillFactor = 100 |
| | = | 2 otherwise |
| cK_X | = | 0 if FillFactor = 100 |
| | = | 2 otherwise |
| MaxRowSize | = | 8060; this is also the maximum column size |
| MaxColPerRow | = | 1024 |

Remainder of calculations should be the same as for SQL Server 6.5 with the different constants provided.

Oracle 8.xx

In Oracle the concept of a data block is the same as a page. Thus, the parameter DB_BLOCK_SIZE has the same meaning as PageSize defined above.

The following are constants with units in bytes:

| | | | | |
|---|---|---|---|---|
| KCBH | = | Block common header | = | 20 |
| KDBH | = | Data header | = | 14 |
| KDBT | = | Table data tree entry | = | 4 |
| KTBBH | = | Transaction Fixed header | = | 48 |
| KTBIT | = | Transaction Variable header | = | 24 |
| SB2 | = | Signed Byte | = | 2 |
| UB1 | = | Unsigned Byte | = | 1 |
| UB4 | = | Unsigned Byte | = | 4 |

Define the following variables, used by Oracle:

| | | |
|---|---|---|
| INITRANS_D | = | No. of transactions that can concurrently update a data block |
| INITRANS_X | = | No. of transactions that can concurrently update an index block |
| PCTFREE | = | Percentage of available data block space set aside for expanding rows of data or indexes via the UPDATE command |
| PCTUSED | = | Threshold at which INSERTs can or cannot be made to a data block; this is presumably after the data block has been first filled to (100 − PCTFREE) % of capacity |

Define the following variables, used in the calculations:

| | | |
|---|---|---|
| BlkHeader_D | = | Size of header used in a data block |
| | = | KCBH + UB4 + KTBBH + INITRANS_D * (KTBIT − 1) + KDBH |
| | = | 86 + 23 * INITRANS_D |
| BlkHeader_X | = | Size of header used in an index block |
| | = | Fixed portion + Variable portion |
| | = | 113 + 24 * INITRANS_X |
| SmallCol_D | = | No. of columns in table with size less than 250 bytes |
| LargeCol_D | = | No. of columns in table with size greater than 249 bytes |
| SmallCol_X | = | No. of columns in index with size less than 128 bytes |

-continued

| | | |
|---|---|---|
| LargeCol_X | = | No. of columns in index with size greater than 127 bytes |
| Then | | |
| FillFactor_D | = | 100 − PCTFREE |
| CK_D_R | = | 0 |
| CK_D_B | = | SB4 |
| | = | 4 |
| PageSize_A_D | = | PageSize − BlkHeader_D |
| | = | PageSize − 86 − 23 * INITRANS_D |
| RowSize_D | = | Row header plus sum of column sizes plus sum of column overheads + SB2 |
| | = | (3 * UB1 ) + Σ (FixedBytes_D + VarBytes_D) + 1 * SmallCol_D + 3 * LargeCol_D + SB2 |

Note that RowSize_D must be at least nine bytes. Note also in the above calculations that the row size is often calculated based on the aggregate of the average column sizes rather than the maximum sizes. Using the maximums we get a more pessimistic estimate of the storage requirement.

Oracle indexes are of the Non-physical-order type. Thus, for indexes we have

| | | |
|---|---|---|
| PageSize_A_X | = | PageSize − BlkHeader_X |
| RowSize_L | = | (Row header) + (ROWID Length + ROWID Byte) + (Sum of column sizes) + (Sum of column overheads) |
| | = | 9 + Σ (FixedBytes_X + VarBytes_X) + 1 * SmallCol_X + 3 * LargeCol_X |
| RowSize_X | = | RowSize_L − (ROWID Length + ROWID Byte) |
| | = | RowSize_L − 7 |

Further Discussion of Example

Oracle

Oracle stores only the bytes required to store a data value. No padding occurs. An exception is a column that has been declared CHAR, in which case padding with spaces occurs.

The size of PCTFREE becomes relevant if the initial values of columns are NULL, or the initial sizes of VARCHAR columns are small.

The relationship between PCTFREE and PCTUSED is further clarified as follows:

A block may be filled via INSERTs until the block is (100—PCTFREE) % full. When UPDATEs to existing rows are made, the overflow of row size increases is to the space provided via PCTFREE. INSERTs cannot be made until the amount of free space not attributed to PCTFREE space is less than (100—PCTUSED) %; this occurs as a result of row deletion.

The leaf page contains the index information plus the ROWID. If the index is not unique, then the ROWID is considered another column; consequently, an additional length byte is required.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for calculating the size of mass storage for data in a selected relational data base system having a plurality of pages with a page size and having a relational database table having a plurality of rows each with a row size, comprising the steps of:

setting an available page storage size in each of the pages to the page size of the relational database system;

reducing said available page storage size a first time by subtracting out a first margin having a first number of rows;

calculating a number of rows per page by dividing the available page storage size by the row size;

calculating a required number of data pages by dividing the number of rows by the number of rows per page; and calculating the total required data storage space by multiplying said required number of data pages by the available page storage size.

2. A method for calculating the size of mass storage for data as recited in claim 1, further comprising:

reducing said available page storage space a second time by multiplying said once reduced space by a second proportionality factor.

3. A method for calculating the size of mass storage for data as recited in claim 2, further comprising;

reducing said twice reduced available storage space a third time by subtracting a third margin having a number of bytes.

4. A method for calculating the required bytes of mass storage for data in a plurality of pages in a relational database table having a plurality of rows comprising the steps of:

using the first relation $$MStg\_D = nPages\_D * PageSize,$$

wherein nPages_D is calculated using a second relation $$nPages\_D = CEILING(nRcd/nRcdPerPage\_D),$$

wherein nRcdPerPage_D is calculated using a third relation $$nRcdPerPage\_D = int((FillFactor\_D * PageSize\_A\_P - CK\_D\_B)/RowSize\_D) - CK\_D\_R;$$

wherein

FillFactor_D represents the proportion of PageSize_A_D that is available for data rows on initial load, PageSize_A_D represents the amount of space available on a data page to hold data records, CK_D_B represents a constant, non-negative integer used to adjust the available space in a page and having the units of bytes, RowSize_D represents the size of a record in a table after formatting, CK_D_R represents a constant, non-negative integer number of records used to assure room for CK_D_R more records after initial load, and nRcd is the number of records in the table.

5. A method for determining the number of index pages in a relational database having a B-tree physical order index comprising the steps of:

calculating the number of index pages nPages_K using the relation $$nPages\_K-1+nPages\_D*((1-(1/nRcdPerPage\_K)\hat{\ }(m-2))/(nRcdPerPage\_K-1));$$

wherein nPages_D is the number of data record pages using a relation Pages_D=nRcd/nRcdPerPage_D, wherein nRcdPerPageD is a number of data records per page of data records calculated using a relation $$nRcdPerPage\_D=int((FillFactor\_D*PageSize\_A\_D-CK\_D\_B)/RowSize\_D)-CK\_D\_R;$$

wherein m is a number of levels in the B-tree calculated using a relation $$m=CEILING[log(nPages\_D)/log(nRcdPerPage\_K)+1];$$

wherein nRcdPerPage_K is the average number of index records per page of index records in physical order indexes calculated according to a relation $$nRcdPerPage\_K=Int(FillFactor\_K*PageSize\_A\_K/RowSize\_K)-cK\_K;$$

wherein
FillFactor_D represents the proportion of PageSize_A_D that is available for data rows on initial load
PageSize_A_D represents the amount of space available on a data page to hold data records,
CK_D_B represents a constant, non-negative integer used to adjust the available space in a page and having the units of bytes,
RowSize_D represents the size of a record in a table after formatting,
CK_D_R represents a constant, non-negative integer number of records used to assure room for CK_D_R more records after initial load,
FillFactor_K represents the proportion of PageSize_A_K that is available for index rows on initial load,
PageSize_A_K represents the amount of space available in an index page to hold index records,
RowSize_K represents the size of an index row after adding formatting for physical order indexes,
CK_K represents a constant non-negative integer, and
nRcd represents the number of records in the table.

6. A method for determining the number of index pages in a relational database having a B-tree non-physical order index comprising the steps of:
calculating the total number of index pages in a non-physical order system using the relation nPages_T= nPages_L+nPages_X,
wherein nPages_L is the number of leaf pages calculated using the relation $$nPages\_L=CEILING[nRcd/nRcdPerPage\_L];$$

wherein nRcd represents the number of records in the table;
wherein nRcdPerPage_L represents the average number of index records per leaf page of index records for non-physical order indexes using the relation $$nRcdPerPage\_L=int((FillFactor\_X*PageSize\_A\_X)/RowSize\_L)-CK\_L;$$

wherein PageSize_A_X represents the amount of space available on an index page to hold index records;
wherein RowSize_L represents the size of a leaf index record after formatting;
wherein CK_L represents a constant non-negative integer used to insure there is room for at least CK_L more index records when inserting or modifying data records;
wherein nPages_X is the number of index record pages per index page for non-physical order pages using the relation $$nPages\_X=1+nPages\_L*((1-(1/nRcdPerPage\_X)\hat{\ }(m-2))/(nRcdPerPage\_X-1));$$

wherein nRcdPerPage_X represents the average number of index records per non-leaf page of index records for non-physical order indexes using the relation $$nRcdPerPage\_X=int((FillFactor\_X*PageSize\_A\_X)/RowSize\_X)-CK\_X;$$

wherein m is a zero based number of levels in the B-tree calculated using the formula $$m=CEILING[log(nPages\_L)/log(nRcdPerPage\_X)]+2.$$

7. A method for calculating the mass storage required for a data base table having a number of records in a database management system, wherein the data base management system specifies a predetermined number of bytes per page, the method comprising the steps of:
a. dividing the number of records in the data base table by a number of data records per page; wherein the number of data records per page is calculated by dividing the number of bytes per page by the number of bytes per row to provide a first value, taking the int function of the first value to produce a second value, and reducing the second value by a number of records per page; and
b. taking the ceiling function of the result of step a; and
c. multiplying the result of step b times the number of bytes per page.

8. A method as recited in claim 7, further comprising reducing the number of bytes per page by multiplying the number of bytes per page by a fractional fill factor prior to dividing the number of bytes per page by the number of bytes per row.

9. A method as recited in claim 7, further comprising reducing the number of bytes per page by subtracting a number of bytes per page prior to dividing the number of bytes per page by the number of bytes per row.

10. A method for calculating the mass storage required for a data base table having a number of records in a database management system, wherein the data base management system specifies a predetermined number of bytes per page, the method comprising the steps of:
a. dividing the number of records in the data base table by a number of data records per page, wherein the number of data records per page is determined by:
reducing the number of bytes per page by multiplying the number of bytes per pages by a fractional fill factor to produce a first value;
reducing the first value by subtracting a number of bytes per page to produce a second value;
dividing the second value by the number of bytes per row to produce a third value;
taking the integer function of the third value;
reducing the third value by subtracting a number of records per page; and
b. multiplying the result of step a by the number of bytes per page.

11. A method for calculating the mass storage required for a B-tree index for a data base table having a number of records in database management system, wherein the data base management system has a number of bytes per page, wherein the database management system has a physical order index, comprising the steps of;
   a. providing the number of pages required for data storage;
   b. providing the number of levels in the B-tree including the leaf levels;
   c. dividing the number of bytes per page by the number of bytes per row;
   d. taking the int function of the result of step c, thereby obtaining the average number of index records per page;
   e. taking the inverse of the average number of index records per page from step d;
   f. taking the result of step e and raising the result to the power of 2 less than the number of B-tree levels from step b;
   g. subtracting the result of step f from 1;
   h. dividing the result from step g by the result of step d minus 1;
   i. multiplying the result from step h by the number of pages of data; and
   j. adding 1 to the result of step e.

12. A method for calculating the mass storage as recited in claim 11, further comprising multiplying the number of bytes per page times a fractional fill factor before dividing by the number of bytes per row in step c.

13. A method for calculating the mass storage as recited in claim 12, further comprising reducing the records per page by subtracting a number of records per page from the result of step d in obtaining the average number of index records per page.

14. A method for calculating the mass storage required for a B-tree index for a data base table having a number of records in database management system, wherein the data base management system has a maximum number of bytes per page and has a physical order index, the method comprising the steps of:
   a. providing the number of pages required for data storage;
   b. providing the number of levels in the B-tree including the leaf levels;
   c. dividing the number of bytes per page by the number of bytes per row;
   d. taking the int faction of the result of step c;
   e. setting the average number of index records per page to the result from step d;
   f. taking the inverse of the average number of index records per page from step e;
   g. taking the result of step f and raising the result to the power of 2 less than the number of B-tree levels from step b;
   h. subtracting the result from step g from 1;
   i. dividing the result from step h by the result from step e less 1;
   f. multiplying the result from step i by the number of pages of data; and
   g. adding 1 to the result of step f;
   c. multiplying the number of bytes per page times a fractional fill factor and dividing by the number of bytes per row;
   d. taking the int function of the result of step c;
   e. reducing the records per page by subtracting a number of records per page from the result of step d and obtaining the average number of index records per page.

15. A method for calculating the mass storage as recited in claim 14, further comprising multiplying the number of bytes per page times a fractional fill factor before dividing by the number of bytes per row in step c.

16. A method for calculating the mass storage as recited in claim 15, further comprising reducing the records par page result from step d by subtracting an overhead number of records per page from the result of step d, thereby reducing the number of record per page for the result from step d.

17. A method for calculating the mass storage required for a B-tree index for a data base table having a number of records in database management system, wherein the data base management system has a number of bytes per page, wherein the database management system has a non-physical order index, comprising the steps of:
   a. providing the number of pages required for data storage;
   b. providing the number of levels in the B-tree including the leaf levels;
   c. dividing the number of bytes per page by a number of bytes per row;
   d. taking the int function of the result of step c;
   e. setting an average number of index records per page to the result of step d;
   f. taking the inverse of the average number of index records per page from step e;
   g. taking the result of step f and raising the result to the power of 2 less the number of B-tree levels from step b;
   h. subtracting the result from step g from 1;
   i. dividing the result from step h by the result from step e less 1;
   f. multiplying the result from step i by the number of index leaf pages; and
   g. adding the number of index leaf pages to the result of step f to obtain the total number of index pages.

18. A method for calculating mass storage as recited in claim 17, further comprising multiplying the number of bytes per page times a factional fill factor before dividing by the number of bytes per row in step c.

19. A method for calculating mass storage as recited in claim 18, further comprising reducing the records per page by subtracting a number of records per page from the result of step d and reducing the average number of index records per page.

20. A method as recited in claim 17, wherein the number of levels in the B-tree is calculated by method comprising the steps of:
   a. taking the logarithm of the number of non-leaf node index pages;
   b. divide the logarithm of the number of leaf node pages by the result from step a; and
   c. add two to the result of step b.

21. A method for calculating the mass storage requirements of a relational database table having at least one B-tree index in a RDBMS wherein the mass storage requirements are sized in pages each having a plurality of bytes, comprising the steps of:

providing the number of records in the table;

providing the number of columns in the table;

providing the size of each record in the table;

providing the size of each page;

non-iteratively calculating the page and byte size required for each B-tree;

non-iteratively calculating the page and byte size required for the data portion of each table; and non-iteratively calculating the size required for each table including the totals of said data storage and said index storage.

22. A computer program product for calculating the mass storage requirements of a relational database table having at least one B-tree index in a database management system wherein the mass storage requirements are sized in pages each having a plurality of bytes, said computer program product comprising:

a computer useable medium having computer readable program code means embodied in said medium for causing a computer to calculate said mass storage requirements for said relational database table, said computer program product having:

computer readable program code means for causing said computer to obtain the number of records in the table, the number of columns in the table, the size of each record in the table, and the size of each page;

computer readable program code means for causing said computer to non-iteratively calculate the page and byte size required for each B-tree;

computer readable program code means for causing said computer to non-iteratively calculate the page and byte size required for the data portion of each table; and computer readable program code means for causing said computer to non-iteratively calculate the size required for each table including the totals of said data storage and said index storage.

23. A method for calculating the size of mass storage for data in a selected relational data base system having a plurality of pages with a page size and having a relational database table having a plurality of rows each with a row size, comprising the steps of:

setting an available page storage size in each of the pages to the page size of the selected relational database system;

reducing the available page storage size in at least selected pages by a fractional fill factor;

calculating a number of rows per page by dividing the available page storage size by the row size;

calculating a required number of data pages by dividing the number of rows by the number of rows per page; and calculating the total required data storage space by multiplying said required number of data pages by the available page storage size.

* * * * *